(12) United States Patent
Posillico et al.

(10) Patent No.: US 11,693,933 B2
(45) Date of Patent: Jul. 4, 2023

(54) 3D PRINTER AND INVENTORY CONTROL AND DISTRIBUTION SYSTEM FOR 3D DESIGNS

(71) Applicant: Kaboodl, LLC, Wilmington, DE (US)

(72) Inventors: Francesco Posillico, Massapequa, NY (US); Timothy Allan Page, Reno, NV (US)

(73) Assignee: Kaboodl, Inc., Wilmington, DE (US)

( * ) Notice: Subject to any disclaimer, the term of this patent is extended or adjusted under 35 U.S.C. 154(b) by 24 days.

(21) Appl. No.: 16/835,500

(22) Filed: Mar. 31, 2020

(65) Prior Publication Data

US 2020/0285718 A1 Sep. 10, 2020

Related U.S. Application Data

(63) Continuation of application No. 16/666,735, filed on Oct. 29, 2019, now Pat. No. 10,839,051, which is a (Continued)

(51) Int. Cl.
G06F 21/12 (2013.01)
G06Q 30/0601 (2023.01)
G06F 21/10 (2013.01)

(52) U.S. Cl.
CPC .......... *G06F 21/123* (2013.01); *G06F 21/105* (2013.01); *G06F 2221/0753* (2013.01); *G06F 2221/0797* (2013.01); *G06Q 30/0635* (2013.01)

(58) Field of Classification Search
CPC ...... G06F 21/123; G06F 21/60; G06F 21/608; G06F 2221/0753; G06Q 30/0635
See application file for complete search history.

(56) References Cited

U.S. PATENT DOCUMENTS 6,282,654 B1  8/2001 Ikeda
6,314,409 B2  11/2001 Schneck
(Continued)

FOREIGN PATENT DOCUMENTS

CN  106776431  5/2017
EP  3 156 926  4/2017
(Continued)

OTHER PUBLICATIONS

Stefan Bechtold, 3D Printing, Intellectual Property and Innovation Policy, Springer (Year: 2016).*
(Continued)

*Primary Examiner* — Shanto Abedin
(74) *Attorney, Agent, or Firm* — Thomas A. O'Rourke; Bodner & O'Rourke, LLP

(57) ABSTRACT

A computer system is configured for digital rights management for distributing and tracking downloadable proprietary source code defining a 3-D object and being usable to print the object on a 3D printer and protect the 3D object data from unauthorized printing. The computer system stores an inventory of proprietary source code corresponding to designs of a plurality of 3D objects, and enables a user to see the inventory of designs of the plurality of 3D objects in an online store, and permits the user to securely purchase use of the source code of a desired 3D object viewed therein. The computer system sends the proprietary source code defining the desired 3D object to a 3D printer, and controls printing of the desired 3D object made by the 3D printer to prevent further use of the source code when the purchased use in completed, using one of three different typologies.

9 Claims, 23 Drawing Sheets

Related U.S. Application Data continuation of application No. 15/842,083, filed on Dec. 14, 2017, now Pat. No. 10,546,105.

(60) Provisional application No. 62/433,907, filed on Dec. 14, 2016.

(56) References Cited

U.S. PATENT DOCUMENTS

| | | | |
|---|---|---|---|
| 6,378,070 | B1 | 4/2002 | Chan |
| 6,463,538 | B1 | 10/2002 | Elteto |
| 6,681,212 | B1 | 1/2004 | Zeng |
| 6,904,527 | B1 | 6/2005 | Parlour |
| 7,111,285 | B2 | 9/2006 | Smith |
| 7,155,415 | B2 | 12/2006 | Russell |
| 7,627,119 | B2 | 12/2009 | Bussert |
| 7,782,190 | B1 | 8/2010 | Morito |
| 7,868,899 | B2 | 1/2011 | Fenney |
| 7,872,772 | B2 | 1/2011 | Caffary |
| 8,245,306 | B2 | 8/2012 | Gimenez |
| RE43,936 | E | 1/2013 | Isaacson |
| 8,412,588 | B1 | 4/2013 | Bodell |
| 8,970,867 | B2 | 3/2015 | Baldwin |
| 9,073,259 | B2 | 7/2015 | Dufort |
| 9,558,330 | B2 | 1/2017 | Pogorelik |
| 9,595,037 | B2 | 3/2017 | Glasgow |
| 9,626,487 | B2 | 4/2017 | Jung |
| 9,805,352 | B2 * | 10/2017 | Anand ................ G06Q 20/20 |
| 10,063,529 | B2 | 8/2018 | Milazzo |
| 10,204,178 | B2 * | 2/2019 | Wegner ................ G06Q 10/06 |
| 10,216,738 | B1 | 2/2019 | Cronin |
| 10,245,821 | B2 | 4/2019 | Pratt |
| 10,513,077 | B2 | 12/2019 | Mattingly |
| 2003/0018895 | A1 | 1/2003 | Morrison |
| 2003/0182475 | A1 * | 9/2003 | Gimenez ................ G06F 21/10 710/8 |
| 2009/0164379 | A1 | 6/2009 | Jung |
| 2012/0092724 | A1 | 4/2012 | Pettis |
| 2013/0235412 | A1 * | 9/2013 | Baldwin ................ G06F 3/1238 358/1.14 |
| 2014/0058959 | A1 * | 2/2014 | Isbjornssund .......... B33Y 50/00 705/310 |
| 2014/0067609 | A1 * | 3/2014 | Heger ................ G06Q 30/0623 705/26.61 |
| 2015/0134955 | A1 | 5/2015 | Lacaze |
| 2015/0205544 | A1 * | 7/2015 | Webb .................... G06F 3/1285 358/1.15 |
| 2015/0220291 | A1 * | 8/2015 | Tapley ................... G06F 3/126 358/1.15 |
| 2015/0220748 | A1 * | 8/2015 | Leach .................... G06F 21/10 726/26 |
| 2015/0221053 | A1 * | 8/2015 | Tapley ................. G06F 3/1222 705/310 |
| 2015/0332058 | A1 | 11/2015 | Chen |
| 2016/0098723 | A1 | 4/2016 | Feeney |
| 2016/0167307 | A1 * | 6/2016 | Eramian ............... B29C 64/386 700/98 |
| 2016/0171354 | A1 * | 6/2016 | Glasgow ................ G06Q 30/00 358/1.14 |
| 2016/0210312 | A1 * | 7/2016 | Webb ................. G06Q 30/0635 |
| 2016/0364553 | A1 | 12/2016 | Smith |
| 2017/0142276 | A1 * | 5/2017 | Lacagnina ........... H04N 13/275 |
| 2017/0279783 | A1 * | 9/2017 | Milazzo ................. B29C 64/00 |
| 2017/0372284 | A1 * | 12/2017 | Levy .................... G06F 16/951 |
| 2018/0012311 | A1 | 1/2018 | Small |
| 2018/0257306 | A1 | 9/2018 | Mattingly |
| 2019/0042773 | A1 * | 2/2019 | Zhang .................... B33Y 50/00 |
| 2019/0180291 | A1 | 6/2019 | Schmeling |

FOREIGN PATENT DOCUMENTS

| | | | |
|---|---|---|---|
| EP | 3 432 178 | 1/2019 | |
| KR | 101767959 | 8/2017 | |
| WO | WO 2015/077077 | 11/2013 | |
| WO | WO-2014193311 A1 * | 12/2014 | ......... B29C 67/0051 |
| WO | WO 2019/002687 | 1/2019 | |

OTHER PUBLICATIONS

Quang Do et al, A Data Exfiltration and Remote Exploitation Attack on Consumer 3D Printers, IEEE (Year: 2016).*

Pinshape: Find ,Share and Sell 3D Print Files; Dec. 1, 2017; available at: https://pinshape.com/.

Trinpy—We provide guaranteed printable designs for your desktop 3D printer ; Dec. 1, 2017; available at: https://www.trinpy.com/.

3dFilemarket.com A Growing 3D printing Community; Dec. 1, 2017; available at: https://www.3dfilemarket.com/.

"What is Hashing? [Step-by-Step Guide—Under the Hood of Blockchain]", available at: https://blockgeeks.com/guides/What-is-hashing/), Jul. 24, 2019.

Wade, T.J. & Subramanya, S.R.. (2016). Digital Rights Management in 3D Printing: A Proposed Reference Architecture for Design-to-Fabrication Security and Licensing.

International Conference on Breakthrough in Engineering, Science & Technology—2016 (INC-BEST'16).

* cited by examiner

3D Printing: How it works

1. Single Board Computer

- Customers can browse through different 3D model available for print
- All 3D models are uploaded by designers through an independent designer web portal
- User can purchase a model and print it

3D Printing: How it works

2. Intigo Desktop App

- Independent desktop application available for different platforms including OS X, Microsoft Windows
- Customers can browse through different 3D model available for print on the website or through the full version of the App

FIG. 5
Single Board Computer: Registration

- When device is manufactured and prepared for Market. It should first complete a device registration process
- The device should call an internal server and get a unique hardware id for the device
  attacks ar

- Once a unique id is received at the device, the device should call the central Intigo server along with a secret key known to the devices only, to register itself as an available device. The central server returns private key certs, client ID and a unique public identifier

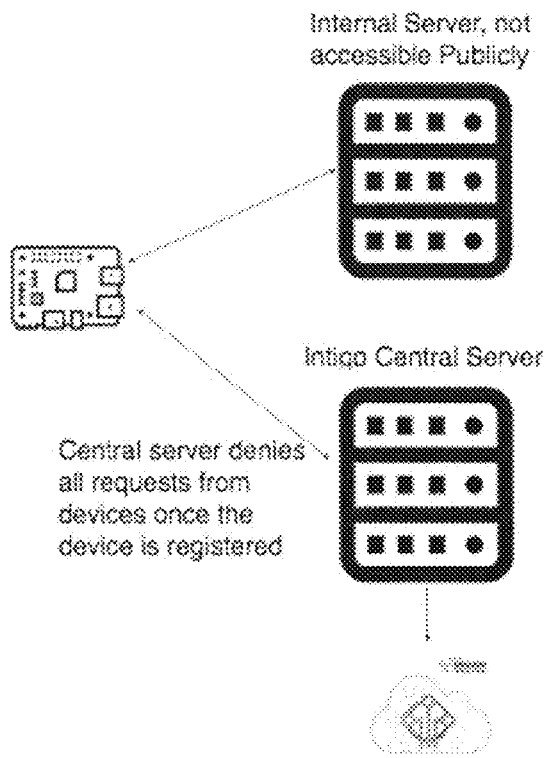

Internal Server, not accessible Publicly

Intigo Cantral Server

Central server denies all requests from devices once the device is registered

FIG. 6
Single Board Computer: Registration

- Central server exposes a public API for devices which can be accessed over a secure channel
- API takes secret key, hardware id to validate the request and process the registration on AWS IOT devices gateway
- API returns the private key certs, client id and unique public identifier which will be stored permanently on the device Intigo Central Server

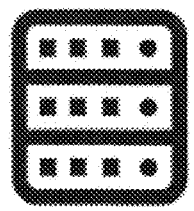
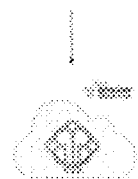

Intigo Desktop App: Registration

- Users can download the desktop App through respective App stores e.g. App Store for OS X and Windows Store for Windows based systems
- Each desktop App will have a unique license key and will be activated when user logs in to the App Intigo Licensing Server Intigo Desktop App

FIG. 8

3D Models

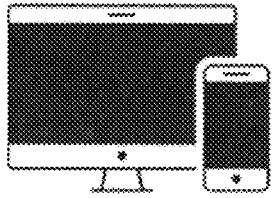

- All the 3D models are upload by designers through a dedicated designer web portal. Designers can register on the portal through an invite or by accessing the portal and sign up using email address
- Users can browse through available 3D models through a Website from their personal computers, laptops or mobile device or through a platform specific Mobile App e.g. iOS App, Android App, Windows 10 App
- User can view details of each 3D model; the details will include 3D view of the model, image gallery of the model from different angles. User can also select the models for Print from the model detail screen. To print a model users must be logged into the user.

FIG. 9
Single Board Computer: User Registration

- Once device is purchased by the user, user should connect the device with their registered Intigo account
- User can use the unique public identifier and enter the identifier through web portal to connect the device, this process can also be achieved by printing a QR code on device with embedded identifier so users won't have to manually add the code.

Single Board Computer: Connectivity

- The Single Board Computer (SBC) device implements IOT device sdk in the device or use Python libraries to constantly listen for new notifications through internet over MQTT protocol

Single Board Computer: Printable file

- Once print notification is received on the device along with a single-time access token, the device communicates with Intigo central server over HTTP protocol using a secure public API
- Central server returns the printable file to the device over a secure channel and also sends all

FIG. 12

Intigo Desktop App: Connectivity

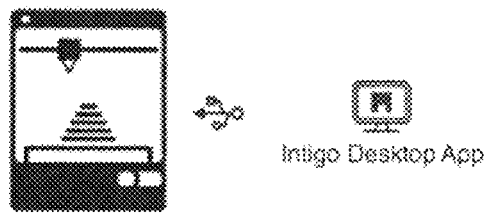
Intigo Desktop App

- The Desktop App contains a full version and a light version running as a service and can be access through toolbar/status bar and starts on each boot up of the desktop. This will always be running in the background even if the full version of the App is not running on user's desktop. The App implements a Push notification system to get notifications from the Intigo Server.

FIG. 13

Intigo Desktop App: Printable file

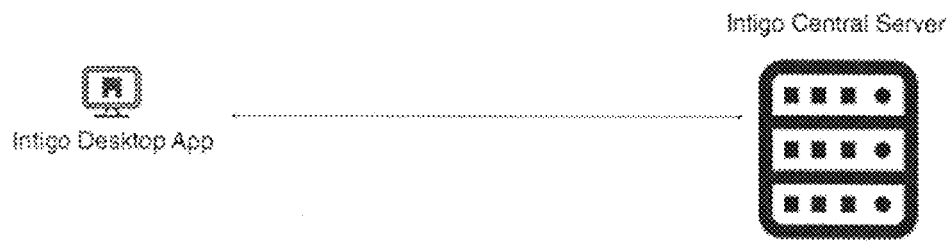

- Once print notification is received on the App along with a single-time access token, the device communicates with Intigo central server over HTTPS protocol using a secure public API
- Central server returns the printable file to the device over a secure channel and also sends all the user selected configurations for gCode generation and if gCode file is available it will send a link to the downloadable gCode file

3D PRINTER AND INVENTORY CONTROL AND DISTRIBUTION SYSTEM FOR 3D DESIGNS

CROSS REFERENCES TO RELATED APPLICATIONS

This application is a continuation of U.S. application Ser. No. 16/666,735, filed on Oct. 2, 2019, which is a continuation of U.S. application Ser. No. 15/842,083, now issued as U.S. Pat. No. 10,546,105, which claims priority on U.S. Provisional Application Ser. No. 62/433,907, filed on Dec. 14, 2016, all disclosures of which are incorporated herein by reference.

FIELD OF THE INVENTION

The present invention relates to improvements in 3D printing and 3D designs that may be downloaded and printed on a 3D printer, and more particularly to apparatus, systems, and a method for protecting such 3D designs when distributed to purchasers in retail or online store environments.

BACKGROUND OF THE INVENTION

Three-dimensional (3D) printing, also referred to as additive manufacturing, is a process in which successive layers of a material, commonly plastic, are deposited to form a three-dimensional object. The definition for the 3D object typically resides in digital data, which may originate as a three-dimensional computer aided design (i.e., solid "digital" models) of the object, or may be derived from a 3D scan of the actual object. The digital surface definition for the object is typically stored in the STL (stereolithography) file format that is native to CAD software developed by 3D Systems, Inc. and is used by the 3D printer to manufacture the object.

Injection molding tends to be less expensive for the production of greater quantities of an object. However, 3D printing is faster, and is more cost-effective where relatively few parts are desired/printed, which is common for the prototyping and proof-of-concept required for development of new designs, and also for the consumer 3D printing community and marketplace (see e.g., Pinshape: Free 3D Printable Files and Designs; Trinpy; Guaranteed Printable Designs for your Desktop 3D Printer; and 3dFilemarket.com A Growing 3D printing Community).

Few of the available repositories of 3D Printable Designs charge a fee for the downloading of its digital data. One of the drawbacks of charging a fee for such downloads is that once the source code has been obtained, the person who made the purchase now has possession of the code and can print as many copies as desired. Moreover, the one-time purchaser could even remarket the design, perhaps even without the use of public advertising, so that the designer may never become aware of the violation of the copyright in his/her original work. Software that is made readily available may enter the public domain.

To counteract piracy, and help enforce copyrights associated with software and other works. Digital Rights Management (DRM) schemes are developed and deployed in the form of access control technologies. One of the oldest versions of DRM is the product key required for the installation of software on a computer. Newer types of DRM are used to limit the alteration and unauthorized copying/distribution of e-books.

The general provision of a system for copying data and limiting the extent of such copying has only been partially addressed in the prior art, as shown by the following: U.S. Pat. No. 6,282,654 to Ikeda; U.S. Pat. No. 6,463,538 to Elteto; U.S. Patent App. Pub. No. 2003/0018895; U.S. Pat. No. 6,681,212 to Zeng; U.S. Pat. No. 6,782,190 to Morito: U.S. Pat. No. 6,904,527 to Parlour; U.S. Pat. No. 7,111,285 to Smith; U.S. Pat. No. 7,155,415 to Russell; U.S. Pat. No. 7,130,831 to Howard; U.S. Pat. No. 7,627,119 to Bussert; U.S. Pat. No. 7,868,899 to Fennery; and U.S. Pat. No. RE43,936 to Isaacson. See also, U.S. Pat. No. 8,234,715 to Zollinger, and U.S. Pat. No. 9,699,519 to Watson.

However, an improved security system is thus necessary for the secure distribution of a digital 3D print file. The present invention provides several solutions to overcome drawbacks of the prior art, and which serve to protect the intellectual property of 3D designers.

OBJECTS OF THE INVENTION

It is an object of the invention to provide apparatus and a method of protecting 3D printable designs from unauthorized printing.

It is another object of the invention to provide an app store from which 3D designs are downloadable for printing, but only according to a defined print/usage limit, and with the source code being protected from piracy.

It is a further object of the invention to provide an app store from which 3D designs are downloadable for printing, and which deletes the source code after a pre-determined time period.

It is another object of the invention to provide an app store from which 3D designs are downloadable for printing, and which deletes the source code after a pre-determined number of prints are made therefrom.

It is also an object of the invention to provide a new 3D printer that is configured to accept a unique print card that may control the printing of 3D designs therefrom.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Apparatus and a method are disclosed to protect the source codes (STL FILE) that interacts with a CAD or 3D printer head operating system. The method contains three categories of storing the source codes (STL) into codes that delete while printing, codes that remain on the device and cannot be redistributed, and codes that have a ticker (codes that delete in a time range or after a specific number of usages). This method solves a problem with the existing 3D print industry with the piracy of their design codes, and allows for protecting of the IP of the design. By doing this we can store existing brands because we can protect the design codes from being redistributed. Designers are beginning to protect the designs they print, and the apparatus and method disclosed herein seeks to protect those designs from illegal redistribution. With the disclosed apparatus and/or method, the codes are protected according to those three categories because it allows for brands to sell their products, and correspondingly allows the customer to print the object according to the restrictions imposed by the purchased category. Therefore, designers and businesses can market special designs according to a time limit, or based on an exact number or printable copies, after which the code is removed from the customer's storage device (e.g., RAM, hard drive, etc.).

BRIEF DESCRIPTION OF THE DRAWINGS

The description of the various example embodiments is explained in conjunction with appended drawings, in which:

FIG. 5 illustrates a first series of registration steps for a single board computer in accordance with the present invention;

FIG. 6 illustrates a second series of registration steps for a single board computer in accordance with the present invention;

FIG. 8 illustrates and defines steps in the 3D printing process in accordance with the present invention:

FIG. 9 illustrates further steps in the registration process in accordance with the present invention;

FIG. 12 illustrates steps with respect to connectivity of a desktop app. for 3D printing in accordance with the present invention;

FIG. 13 illustrates steps with respect to 3D printing from a desktop app. in accordance with the present invention;

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A. B, and C", and "A, B, and/or C" mean all of the following possible combinations: A alone; or B alone; or C alone; or A and B together; or A and C together; or B and C together; or A. B and C together.

Also, all references (e.g., patents, published patent applications, and non-patent literature) that are cited within this documents are incorporated herein in their entirety by reference.

Furthermore, the described features, advantages, and characteristics of any particular embodiment disclosed herein, may be combined in any suitable manner with any of the other embodiments disclosed herein.

The current 3D print market operates on a closed network, which lends itself to certain solutions. Where the 3D print market would operate on an open network, other solutions may be utilized.

The present invention provides for the protection of source code for a 3D design, and interacts with the operating system that controls a 3D printer, and/or controls a computer to which the 3D printer is connected. The system may provide at least three different forms of protection for the source code.

Figure 2:
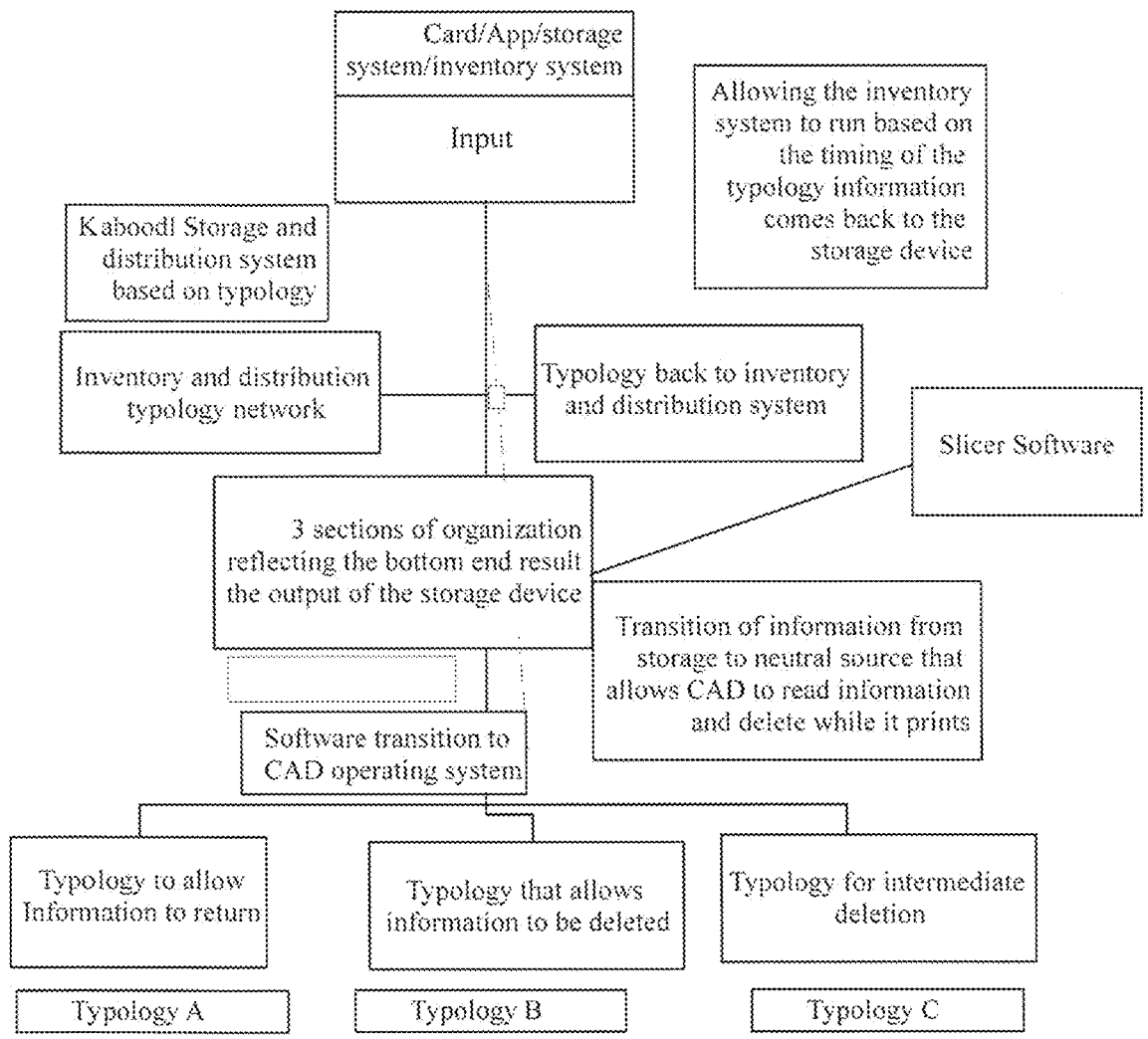
FIG. 2 discloses a flow chart illustrating three typologies fOr a method of controlling a 3D Printer and Inventory Control and Distribution System.

In the first form of protection, the source code may be stored as code that immediately deletes after the object is printed, or which code deletes portions of the code as corresponding portions of the object are printed (i.e., "Typology B" in FIG. 2).

In the second form of protection, the source code is stored in the computer and remains on the device, but is protected from being redistributed (i.e., "Typology A" in FIG. 2).

In the third form the source code may be stored as code that utilizes a counter, so that the code automatically deletes after a specified time period has elapsed, or which automatically deletes after a pre-determined number of usages for printing of the object on the 3D printer has occurred (i.e., "Typology C" in FIG. 2). These three forms of protection permit 3D designs to be marketed and sold, particularly online, while serving to protect the intellectual property interest of the designer in his/her designs.

Another problem solved by the present invention is the provision of a system that may universally accommodate all of the different types of 3D printers, and different 3D print objects, which require a different set up. There currently are seven different types of 3D printers:

Stereolithography (SLA)

Digital Light Processing (DLP)

Fused deposition modeling (FDM)
Selective Laser Sintering (SLS)
Selective laser melting (SLM)
Electronic Beam Melting (FBM)
Laminated object manufacturing (LOM)

All 3D printers are used by consumers by downloading digital files to an SD card and plugging the SD card into a printer, or by digitally downloading the digital file and sending it to the printer. However, the digital file must be adjusted at/for the printer physically by the consumer. The STL file is processed by a piece of software called a "slicer." which converts the model of the object into a series of thin layers and produces a G-code file containing instructions to print the slices, which instructions are tailored to a specific type of 3D printer (e.g., an FDM printer). This G-code file can be printed using 3D printing client software (which loads the G-code, and uses it to instruct the 3D printer during the 3D printing process). The 3D printers have no communication in or out because the industry is closed source and organizations have different designs for different printers. Even with current pay-to-print methods for existing products, the file is still download and must be handled by the consumer and it is therefore not protected.

Use of the methods described herein provide a full automated process with respect to printing of a purchased design file without compromising the IP of the design, by protecting the STL data file, throughout the entire business process.

The three methods disclosed herein are not used/available at the present time because all printers are closed systems that don't protect the design through the whole business process. There is no existing universal plug for designers and various brands to make one design be printable for all the different types of printers. The present invention provides that universal plug, and will create a new marketplace by allowing one design to be printed by all the different types of printers with a click of a button. The herein disclosed physical method protects designs on a card device, etc., and uses the same protection methods allowing customers with designs for a physical object to freely market them while being protected, whereas they heretofore were unable to prevent them from unauthorized redistribution. The present inventions provides physical and/or electronic methods that allows for printing at different locations, while still protecting the designs/code. This enables customers to print at kiosks if they don't want to purchase home printers, while enabling the code to be printed.

Figure 1:
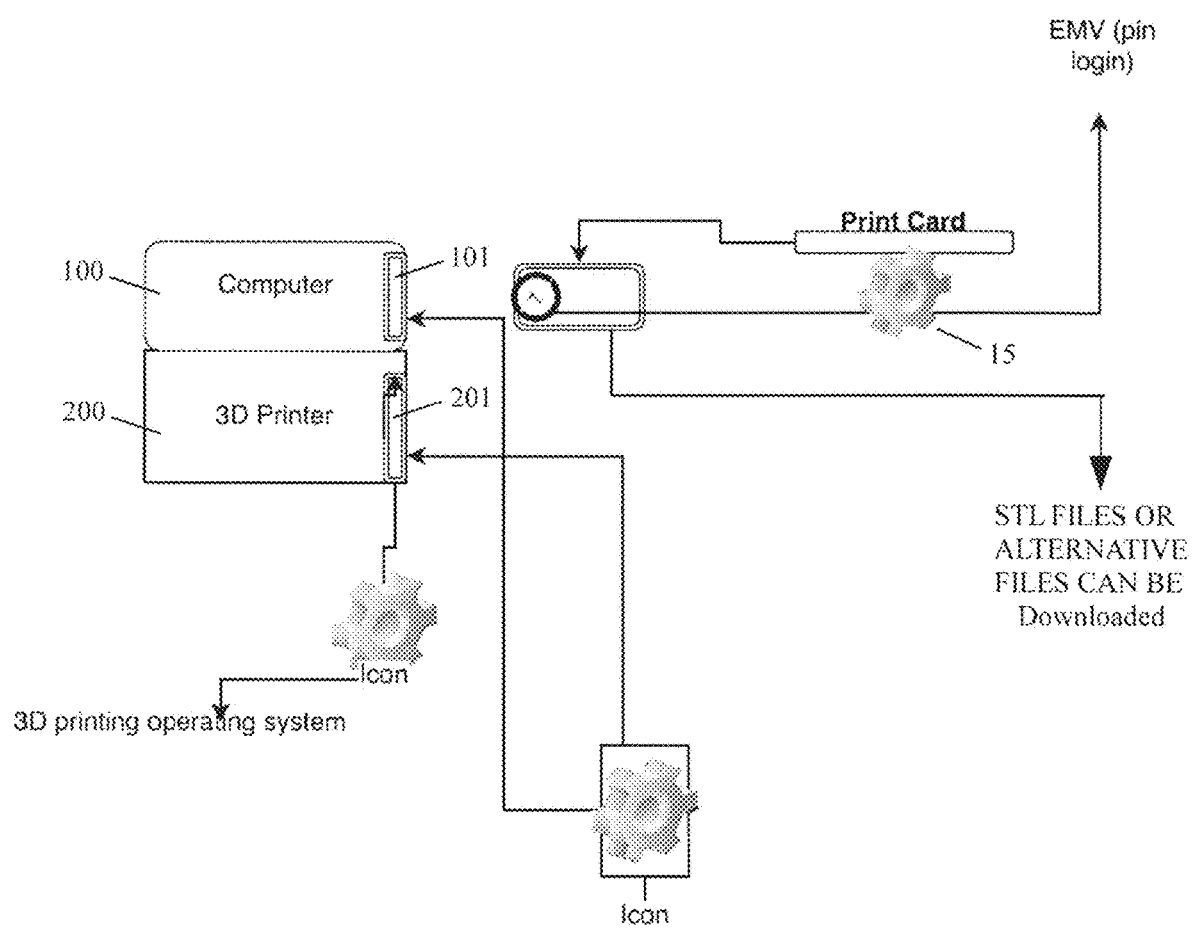
FIG. 1 discloses a flow chart illustrating various aspect of the 3D Printer and Computer System disclosed herein.

The first solution is a universal solution that uses a communication tool that plugs into a printer and delivers the correct code for a design to the printer being used, creating an automated process where the consumer can print with just a press of a button, and not have to adjust the printer(s) and/or the code. FIG. 1 illustrates a new computer system 100, and a new 3D Printer 200, each of which may be configured to be controlled by a print card 15, referred to as a raspberry pie. The computer 100 may include a slot 101, which may be configured to receive the print card 15 therein. The print card 15 may act as an inventory and distribution system for STL files or other such files containing printable 3D data. The print card 15 may also manipulate the operating system of the computer 100 to perform printing according to the three typologies defined above, which may be encoded into the print card according to the characteristics paid for at the time of purchase (i.e., permission to print 2 copies of the object before the code is deleted). Use of the print card may require a personal identification number (PIN) that may be assigned at the time the card is purchased, or at some later time.

In one embodiment of the print card, an analogy may be drawn between the print card of the present invention, and a bank debit card, where along with use of a personal identification number (PIN), the user is allowed to shop via an app/gateway within an online cloud store, and make secure purchases of the source code for a desired 3D object, the printing of which is controlled according to the above-noted methods. The DRM associated with the purchased code is then stored on the card. The card permits access to the online cloud store.

The operating system of the computer 100, which may be manipulated by the print card 15, may allow the user to see the inventory of designs stored on the card, and may also allow the user to browse and download printable 3D designs using an application program ("App") that similarly protects the designs. The computer, under the control of the print-card-manipulated operating system, may send the digital file defining the 3D object to a 3D printer. The operating system of the 3D printer 200 may also correspondingly be manipulated by the print card 15 according to the purchased typology ("A" or "B" or "C" in FIG. 2), particularly if it has its own memory.

A unique 3D printer 200 may also be configured to print designs directly using the print card 15, as the printer 200 may similarly be configured with a slot 201 that may receive the card therein. The print card 15 may have structure similar to, and may also be configured to operate in a manner similar to, a USB flash drive, as shown for example by U.S. Pat. No. 6,763,410 to Yu; U.S. Pat. No. 6,733,329 to Yank: and U.S. Pat. No. 7,287,705 to Tang. The corresponding slots 101 and 201 may thus be configured to read the data from the card 15 being so structured, to operate as described herein.

Figure 3:
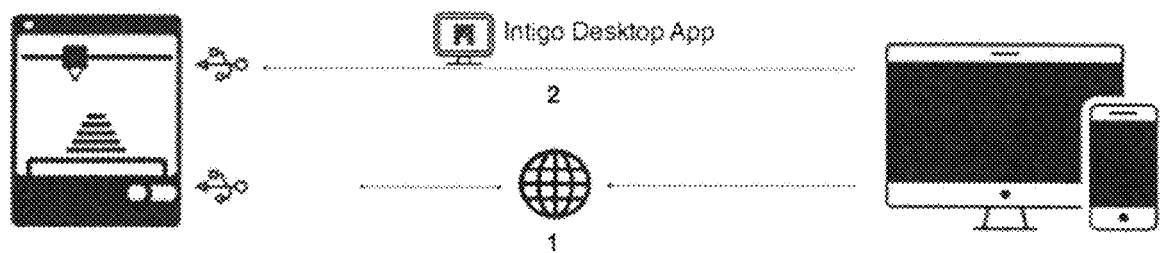
FIG. 3 illustrates how 3D printing works based on a single board computer.

FIG. 3 illustrates how 3D printing works based on a single board computer (SBC) device, which may have an embedded Wi-Fi module for internet connectivity, and which may connect with a 3D printer through a USB interface. The SBC device should have 2-way communication with the 3D printer device to be able to send print commands thereto. In one embodiment, customers can browse through different 3D models available for 3D printing from a library of such models. All 3D models may be uploaded by designers into the library through an independent designer web portal. Users of the system of the present invention can purchase a model and print it by sending an instruction to their purchased SBC device from the user website over the internet. In one embodiment the unique SBC device may connect with any supported 3D printer through a USB cable/port. The current methodologies in practice for 31) printing don't allow direct prints to be made on the 3D printer. The SBC device connected with the 3D printer may also be connected with the internet, which will enable the printer to act as an IOT device. Users can then directly print the files from an associated web portal, and the SBC device may not be directly connected with the user's computer. This also takes out the device/platform dependence for the selection of 3D prints, it can be accessed from any web enabled device including computers, laptops, tablets and mobile phones. In current practice, users download the 3D print files and then manually have to print the 3D object, this takes out the hassle and users with a beginner's skill level can easily print the files. And it also helps secure the 3D printable files, as the files are never accessible to the user and never transferred to the printer's memory, this helps achieve the Pay Per Print business model of the present invention.

Figure 4:
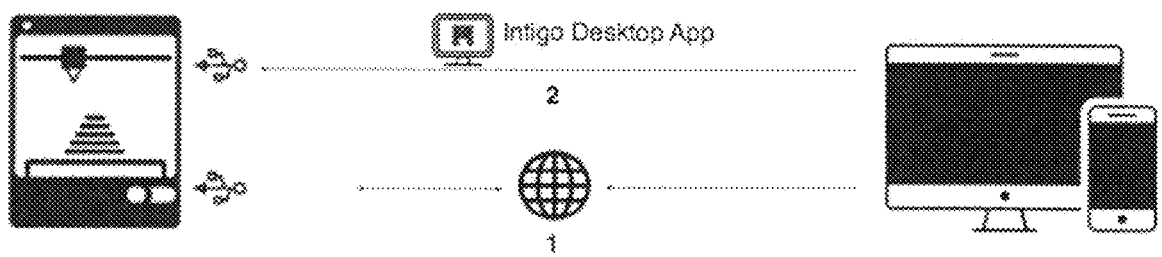
FIG. 4 illustrates how 3D printing works using a desktop app.

FIG. 4 further illustrates how 3D printing works using a desktop app. associated with the present invention. An independent desktop application may be made available for different platforms, including OS X. and Microsoft Windows. The app. can have a complete graphic user interface (GUI) for the 3D printing customers. A light version of the App may be configured to always be running on the device and may be accessed from a toolbar/status bar. Customers can browse through different 3D models available for print on the website or through the full version of the App. User can purchase a model and print it by sending an instruction to their connected 3D printer from the desktop or through the user website. A desktop application may be used for slicing and then transferring printable files to the printer, however the desktop application of the present invention also allows user to browse through a list of available 3D printable models and then print any of the models. The 'light version' of the app helps achieve the "print from anywhere" model of the present invention, if users have this app installed and has it registered under the registered account they can send prints to the printer connected with this application. Users can directly print the files from the web portal, by selecting this application under the list of connected printers. In current practices, users download the files and then manually have to print the 3D object, this takes out the hassle and users can print the files with a beginner's skill level. It also helps secure the 3D printable files, as the files are never accessible to the user and never transferred to the printer's memory, this also helps to achieve the Pay Per Print business model.

FIG. 5 illustrates a first series of registration steps for a single board computer in accordance with the present invention. When the SBC device is manufactured and prepared for market, it should first complete a device registration process as follows. The SBC device may call an internal server and request and receive a unique hardware ID for the device, which ID may be a long alphanumeric string. This is designed to prevent brute force attacks and Denial of Service (DoS) attacks on the Central (Intigo) server. Once a unique Id is received by the device, the device should call the central Intigo server along with a secret key known only by the device, to register itself as an available device. The secret key may be securely embedded in the software; it may be encrypted, and may be a very long sequence of alphanumeric characters.

and there is no way to validate the IDs sent to the server. The internal server generates a unique system known hardware ID for the devices. The internal server may be placed inside the vicinity where the SBC devices will be manufactured/prepared for market, or it can be cloud based with access limited to certain IP locations known to the system. The reason for using an "internal server" and the "central server" is so that the internal server is only used to generate hardware IDs for the SBC devices or license numbers for the desktop applications. The purpose of internal server is to control the access to the server that prevents fake device registrations. The central server is accessible publically and serves all the content for web portals and manages the print system. For devices the central server only accepts incoming web calls having a registered hardware id. The two servers will preferably be separated and all the portals will only have access to the central server, which is primarily for security; the internal server if made public can be used for brute force to bloat the database and to have denial of service attacks on the complete system. With respect to the use of both a "private key" and a "public identifier," the devices connect with an AWS device Gateway through the MQTT protocol over TLS V1.2 to establish a connection. The device uses CA Certs, which are installed on the device to validate the authenticity of devices gateway, and then uses both Private key and Public Pem files to verify its identity for the connection.

FIG. 6 illustrates a second series of registration steps for a single computer in accordance with the present invention. The central server may expose a public API for devices which can be accessed over a secure channel. The API takes the secret key, and hardware id to validate the request and process the registration on an Amazon Web Services (AWS) IOT devices gateway. The API returns the private key certs, client ID and unique public identifier which will be stored permanently on the device. The central server may call AWS IOT services using a restful API and register the device as a thing on things gateway. The central server may register all the devices on AWS IOT and also generates a human readable client id, which becomes the identity of the device. When the user wants to connect that specific device with their registered account, they will use this client ID. Note—the AWS IOT is a service that enables us to send and receive notifications to the devices. The devices are registered on AWS, however client IDs are saved on the central server.

```
MIIFDjBABgkqhkiG9w0BBQ0wMzAbBgkqhkiG9w0BBQwwDgQIS2
qgprFqPxECAggaMBQGCCqGSIb3DQMHBAgD1kGN4ZsIJgSCBM
i1xk9jhlPxP3FyaMIUq8QmckXCs3Sa9g73NQbtqZwI+9X5OhpSg/2A
LxlCCjbqvzgSu8gfFZ4yo+Xd8VucZDmDSpzZGDod
```

The central server returns private key certs, a client ID and a unique public identifier. Each device can only be registered once, to prevent bloating on AWS devices gateway. The internal server is designed for internal access only; this is primarily to be used in SBC device provisioning once the device is prepared for market. The device may connect with the internal server using the internet over a secure HTTPs connection which is accessible only from allowed IP addresses, and the internal server assigns a unique hardware id for the device (which can also be accessed by the Central server). Once the hardware id is assigned to the device, the SBC device can now be registered as a thing through the central server. The purpose of having an internal server for hardware ID is to prevent brute force attacks on the system, as a device can be registered using any SBC ID as reference And also controls the information regarding which device is being connected to what user account.

Figure 7:
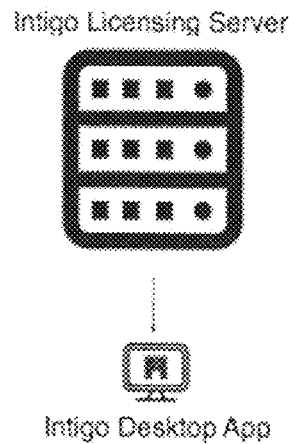
FIG. 7 illustrates a series of registration steps for a desktop app. in accordance with the present invention.

FIG. 7 illustrates a series of registration steps for a desktop app. in accordance with the present invention. Users can download the desktop App through respective App stores e.g. App Store for OS X and Windows Store for Windows based systems. Each desktop App may have a unique license key and may be activated when the user logs in to the App. The App connects with the central (Intigo) licensing server to check the authentication and validity of desktop App. The desktop App once connected with the user account will have synced data and the user can select the App from the list of printer devices on the user web portal.

FIG. 8 illustrates and defines steps in an embodiment of the 3D printing process in accordance with the present invention. All the 3D models are upload by designers through a dedicated designer web portal. Designers can register on the portal through an invite or by accessing the portal and signing up using an email address. Users can browse through available 3D models through a Website from their personal computers, laptops or mobile device or through a platform specific Mobile App, e.g. iOS App, Android App. Windows 10 App. Users can view details of each 3D model; the details may include 3D view(s) of the model, an image gallery of the model from different angles. User can also select the models for Print from the model detail screen. To print a model users must be logged into the user. The print feature will only be available for registered users. When the user clicks Print, the system will check for the an available device. If the user has no registered device or any connected desktop App. the user will be prompted to add a device with instruction on how to get a device or the desktop application. If there are devices connected with the user's account, the user is prompted with a drop down list to select the device or the connected desktop App. After selecting the device or desktop App, the user will have to enter Payment details or an option to use a previously saved payment method. Once payment is successful, print notification is sent to the selected device or desktop App. The user will have to pay for each print; each new print will only initiate once payment is successful. If the user selects a previously printed model they will have to pay for the print again. The print price may be controlled through an Admin portal, it can be same price for all the models or each model can have an independent price for print.

FIG. 9 illustrates further steps in a registration process in accordance with the present invention. Once a device is purchased by the user, the user should connect the device with their registered Intigo account. (Note—the device registration process is for provisioning new devices on the system independent of the user, once the device is registered and a client ID is allocated, it can then be connected with a registered Intigo user account, and the user can register for an account through web portal/application, signing up using email address. and can have an account without any device being connected). The user can use the unique public identifier and enter the client ID printed on the device into a web portal to connect the device, and this process can also be achieved by printing a QR code on the device with an embedded identifier so the users won't have to manually add the code. Once the device is connected with a user, it can't be connected with any other user and the device is marked as an active device until the user deliberately transfers the device to another account.

Figure 10:
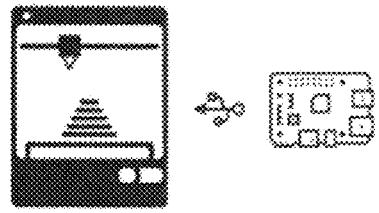
FIG. 10 illustrates steps with respect to connectivity of a registered device for 3D printing in accordance with the present invention.

FIG. 10 illustrates steps with respect to connectivity of a registered device for 3D printing in accordance with the present invention. The Single Board Computer (SBC) device may implement an IOT device sdk in the device or use Python libraries to constantly listen for new notifications over internet using the MQTT protocol. The MQTT is a low bandwidth, lightweight protocol that works on top of the TCP/IP protocol. Once the device is marked as active on the server, i.e., it is connected with a user, it can be used to print 3D models. Every time user purchases a print and sends the instructions to print, this connected device will get a notification over MQTT. The notification will only tell the device that a new print is available for the user and send a single-time access token along with printable model II) for the user. The central server will maintain all the configuration settings configured by the user for printing, including print quality, in-fill density and temperature settings; these will be used by the device to generate 3D printer readable gCode. In this embodiment the token may be a digital entity, which may be an encoded string, that may be used by the central server to identify and verify access to the system. An example of the access token follows:

EAAXK30wgRWcBAGVtmRGkvFGxQG1NPnLZBmi9VYeZC
ZAKRUHkLEYfdXBiSLTNRW4Ic84mqiyrp31X0g1WzbZBNh
aDV21hz6vNKzZBhmyBX7PBXU9VBJoB5jKFRdineA7iSmeli
AFtD4HI0veZBX4VVi3CRQHF4nZBwjtdnz9E1iQa1KLy8sVX
sWp6CU50X6aTm6GIrRRFSUuwVZA85LZAbQBwHjSrpE0R
eAYpBMCKoYCm3pQZDZD In one embodiment, the access token may be usable for a limited time, or for a single time, or for different types of access to the system.

Figure 11:
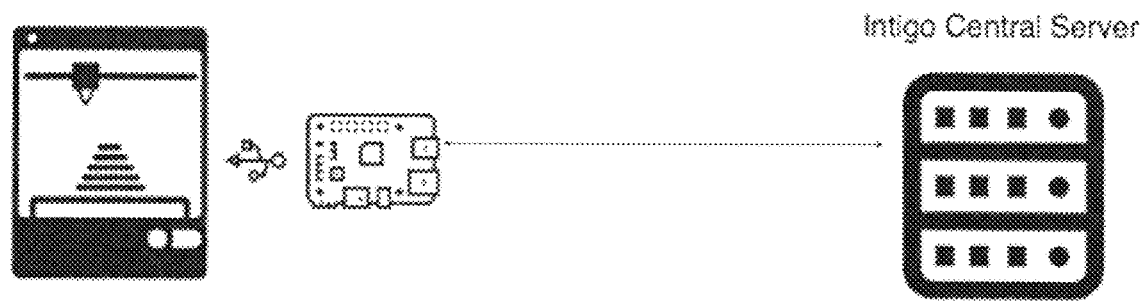
FIG. 11 illustrates process steps with respect to 3D printing in accordance with the present invention.
Figure 14A:
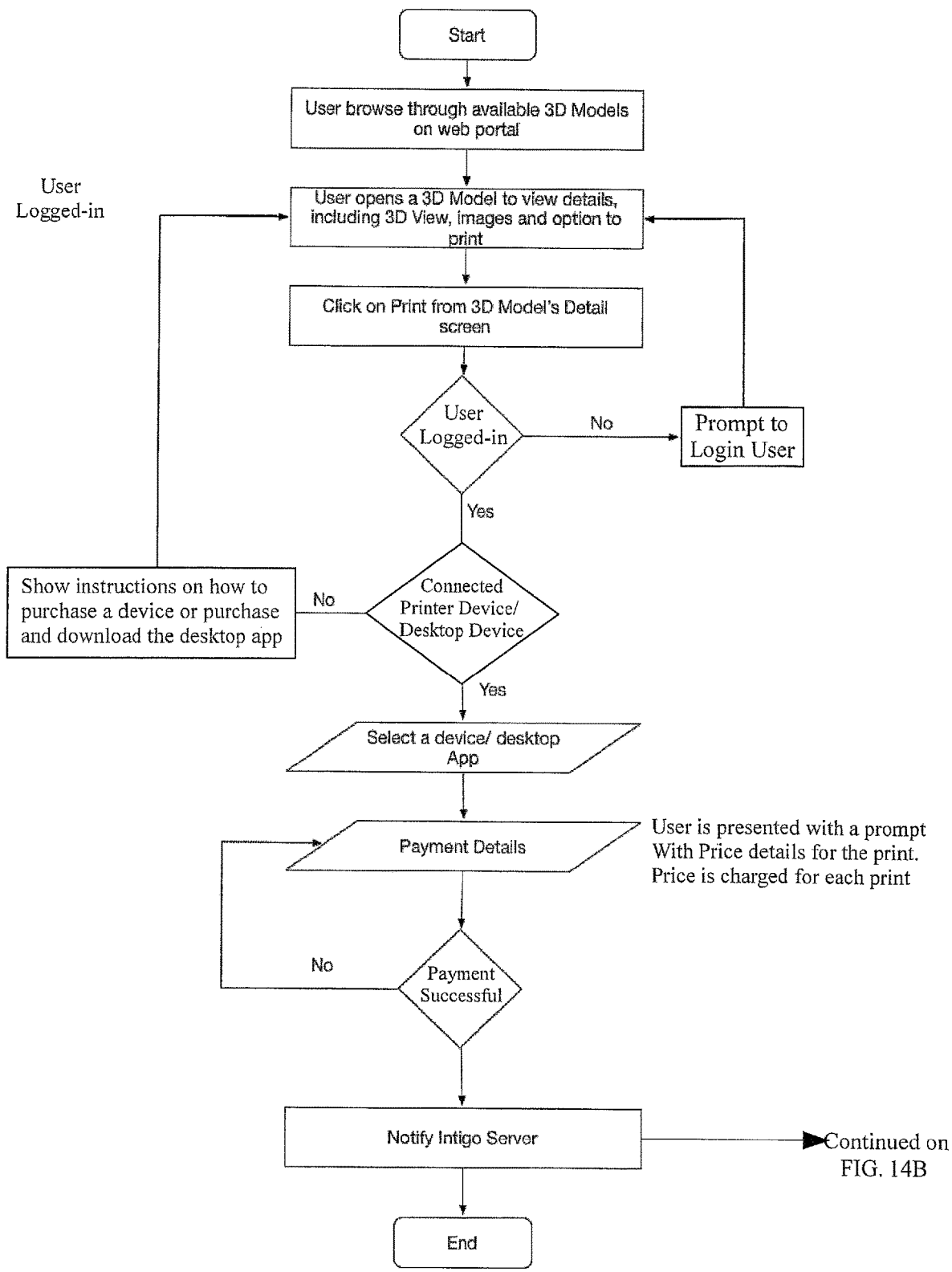
FIG. 14A is a first flow chart of a portion of the 3d printing process of the present invention.
Figure 14B:
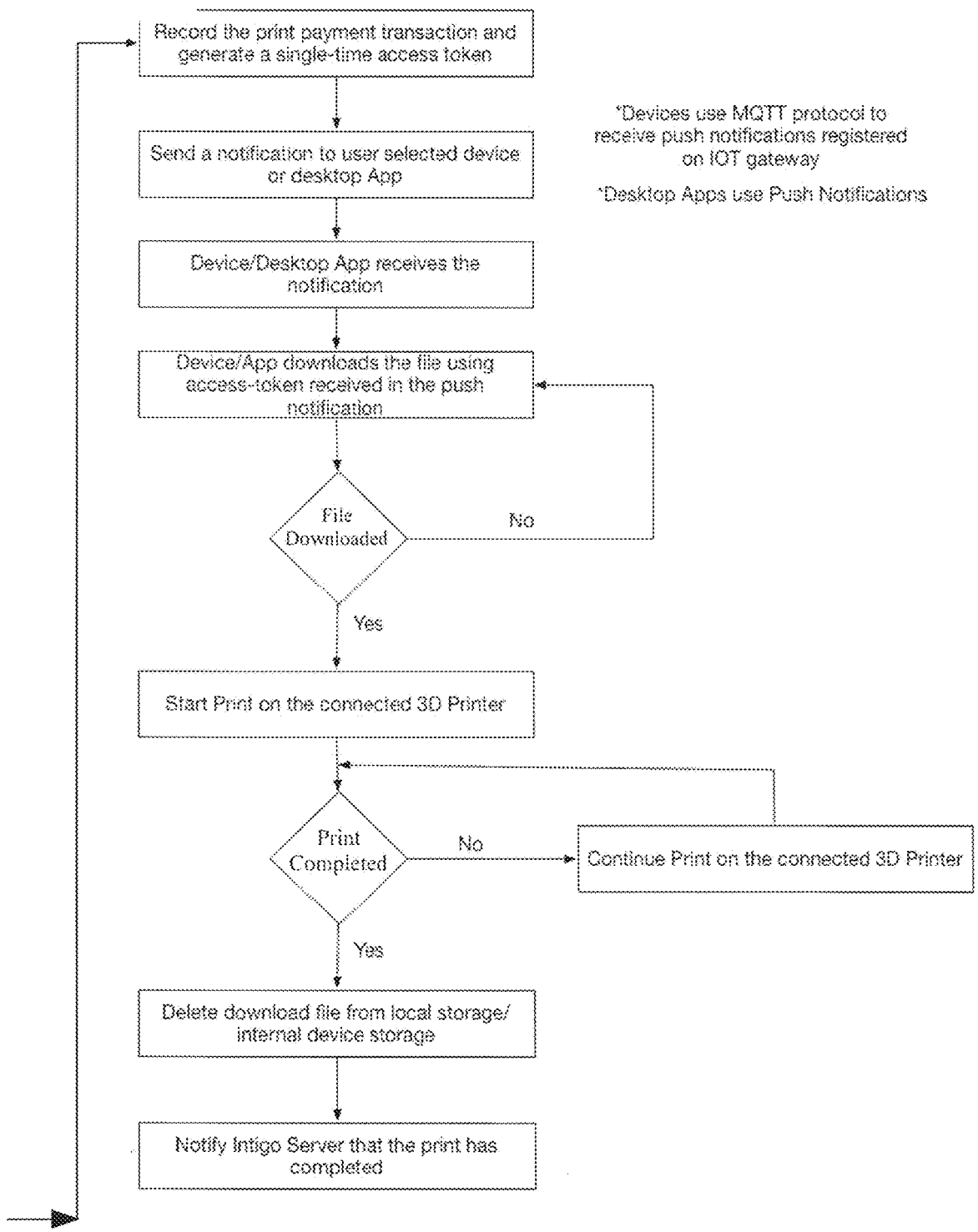
FIG. 14B is a second flow chart of a portion of the 3d printing process of the present invention.
Figure 15:
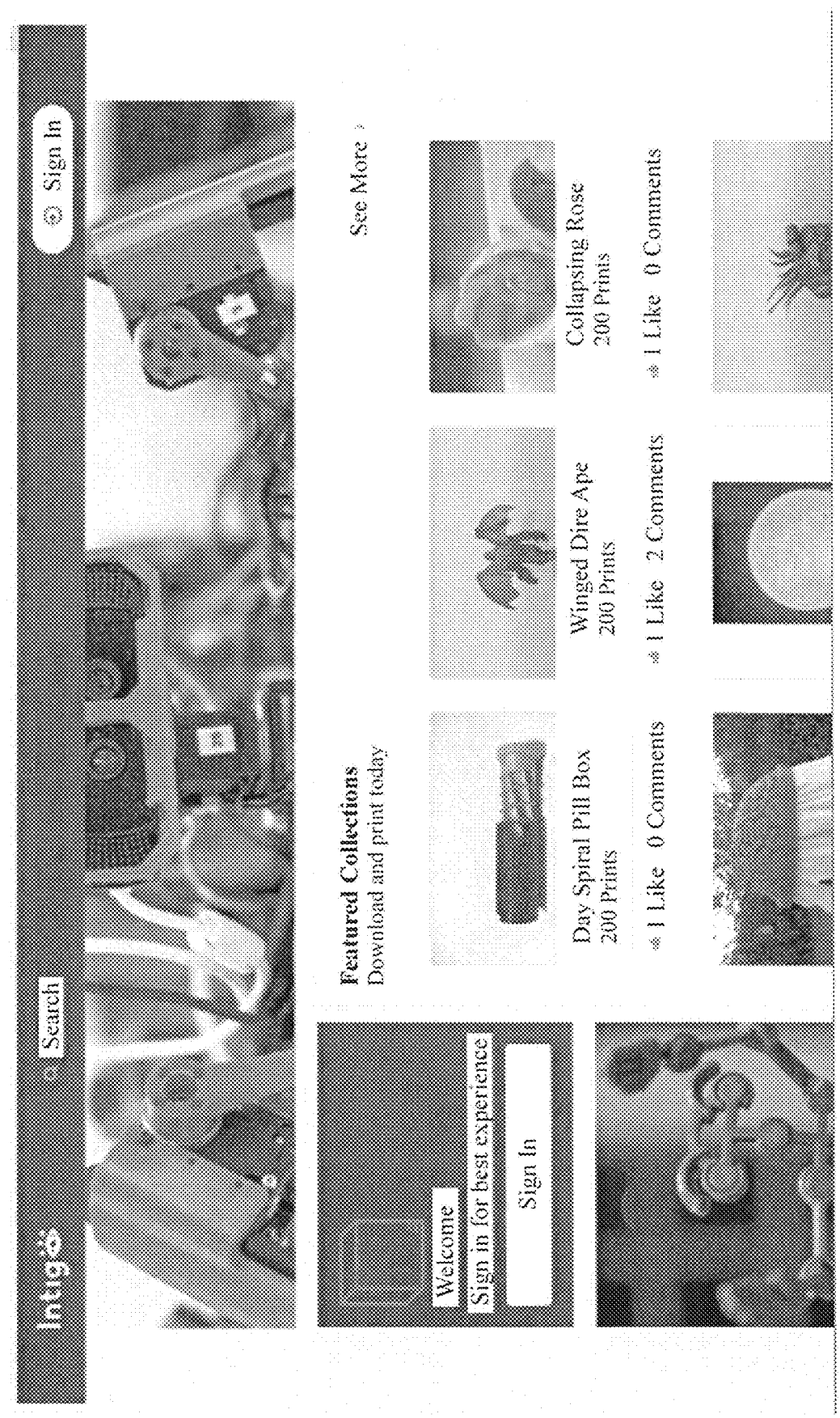
FIG. 15 illustrates a graphical user interface (GUI) screen in accordance with the present invention, being usable to initiate signing in by a user.
Figure 16:
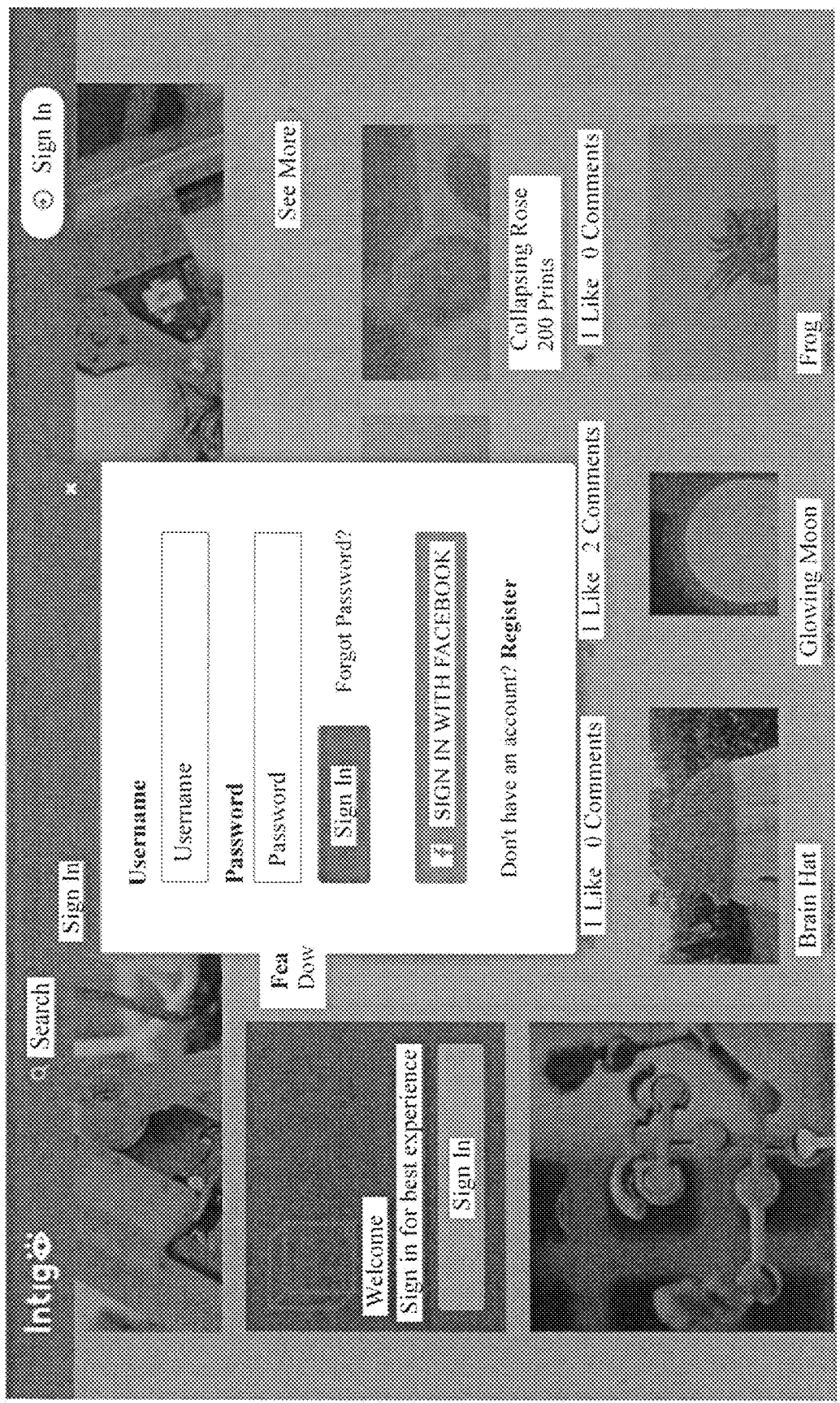
FIG. 16 illustrates a graphical user interface screen usable for signing in of the user into the system.

FIG. 11 illustrates other aspects with respect to 3D printing in accordance with the present invention. Once print notification is received on the device along with a single-time access token, the device may communicate with the central server using the HTTP protocol using a secure public API. The central server returns the printable file to the device over a secure channel and also sends all the user selected configurations for gCode generation. Once the device successfully downloads the file and converts the code it notifies the system using the MQTT protocol, and a notification is sent to user that the file is ready to be printed. After successfully printing of the model, the device notifies the system over the secure channel and deletes the files from it's internal storage. For each new print the user will have to follow the process again and purchase the rights to print the file again.

FIG. 12 describes other aspects with respect to connectivity of a desktop app. for 3D printing in accordance with the present invention. The Desktop App may contain a full version and a light version running as a service and can be accessed through a toolbar/status bar, and may start on each boot up of the desktop. This may always be running in the background even if the full version of the App is not running on user's desktop. The App may implement a Push notification system to get notifications from the Intigo Server. Once a desktop App is marked Active on the server, i.e. it is connected with a user, it can be used to print 3D models. Every time a user purchases a 3D print and sends the instructions to print by selecting the desktop App from the drop down list, the desktop App will get a notification. The desktop App may also check for any pending notifications on startup to check for missed notifications. The notification will only tell the App that a new print is available for the user and may send a single-time access token along with a printable model ID for the user. The central server may maintain all the configuration settings configured by the user for print including print quality, in-fill density and temperature settings; these may be used by the device to generate 3D printer readable gCode.

FIG. 13 describes other aspects with respect to 3D printing from a desktop app. in accordance with the present invention. Once print notification is received on the App along with a single-time access token, the device communicates with the central server over the HTTPS protocol using a secure public API. The central server may return the printable file to the device over a secure channel and also sends all the user selected configurations for gCode generation and if gCode file is available it will send a link to the downloadable gCode file. The App may then check for connected printers over USB. The App will then start printing the file and will show the status of the print. After successful printing of the model, the App notifies the system over the secure channel and deletes the files from it's cache. For each additional 3D print the user will have to follow the process again and purchase the rights to print the file again.

Figure 6A:
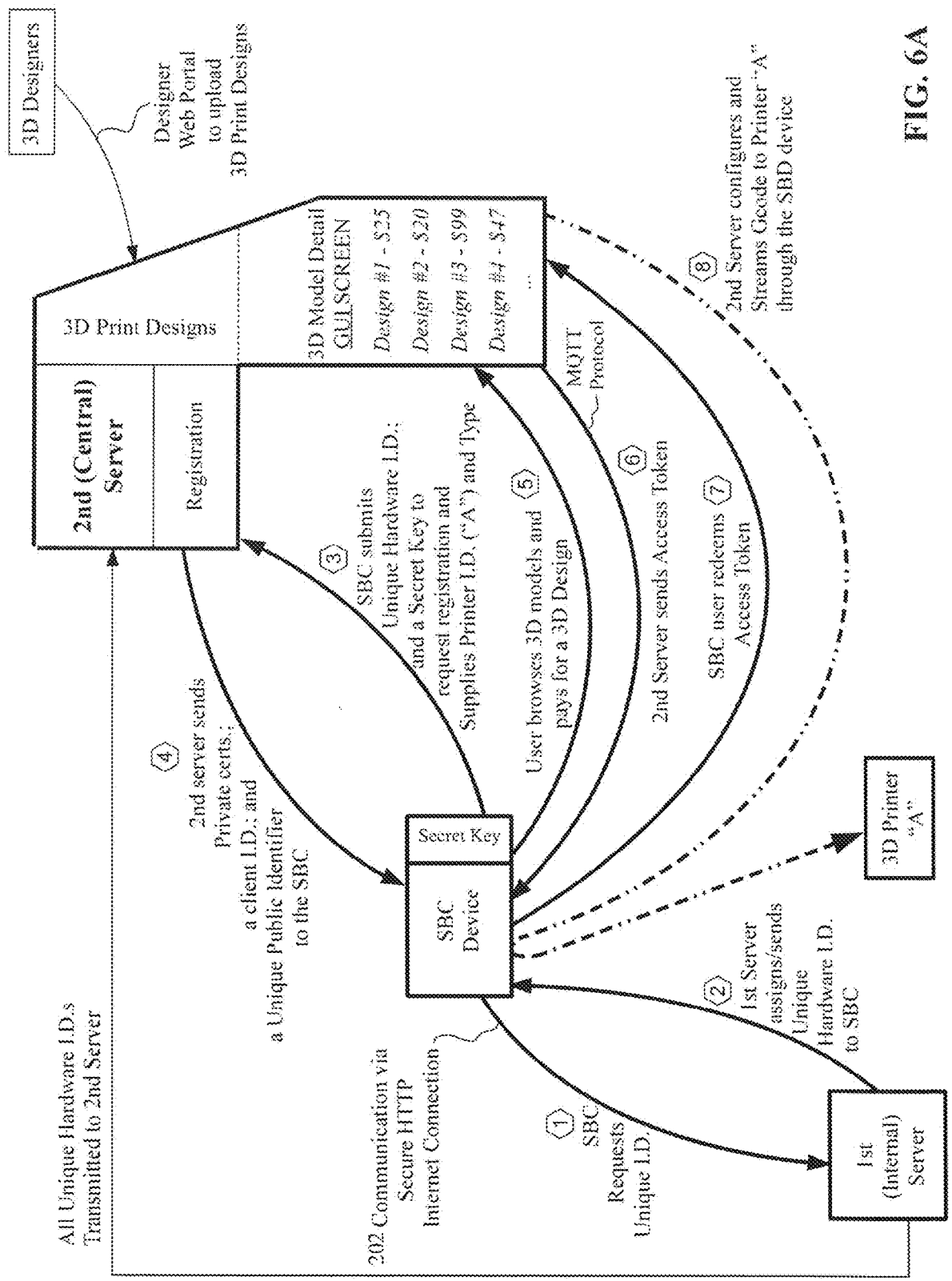
FIG. 6A is a flow chart of portions of the registration process for a single board computer.
Figure 17:
FIG. 17 illustrates a graphical user interface screen of the present invention displaying a 3D print design, which design is available to be printed by a signed-in user.
Figure 18:
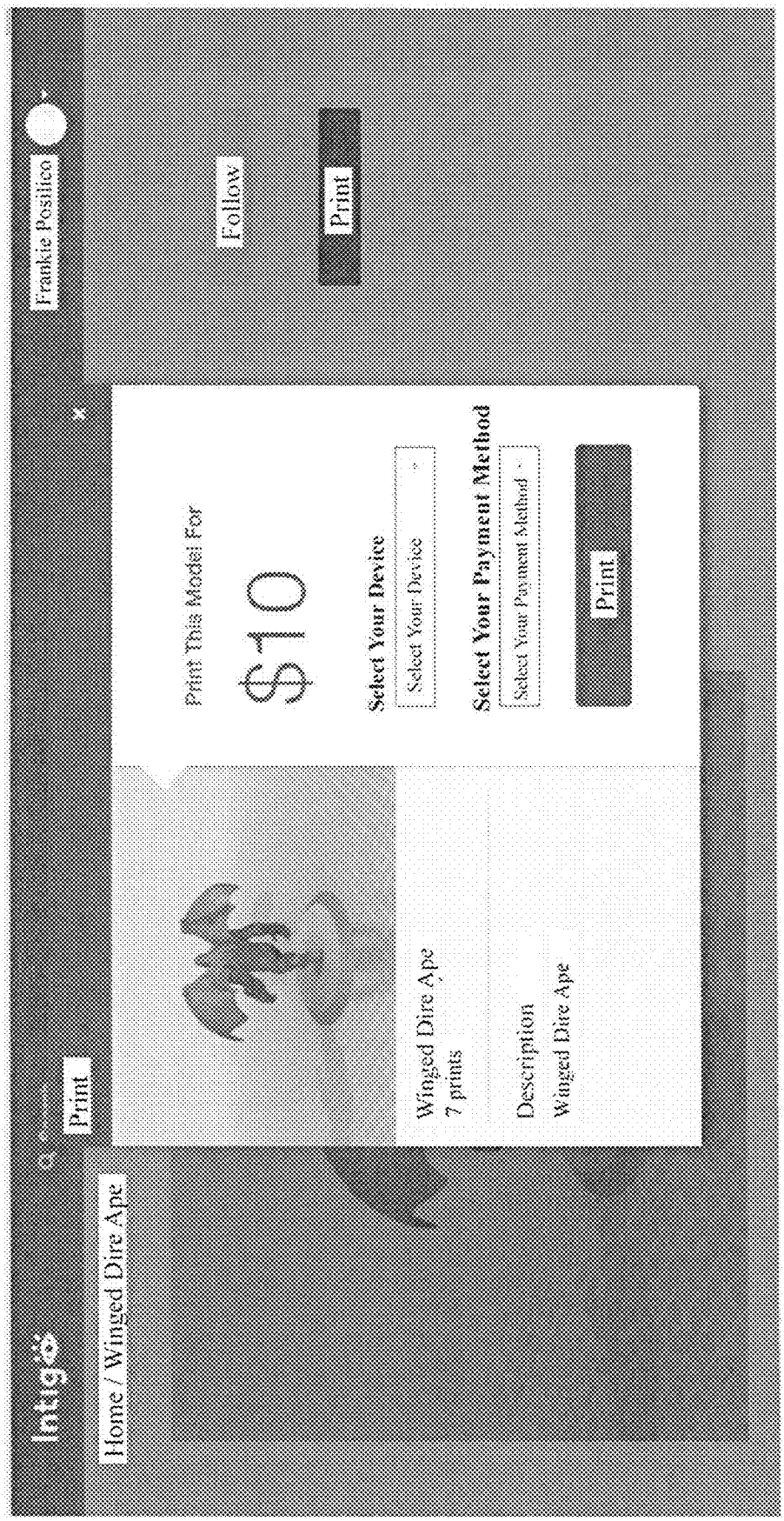
FIG. 18 illustrates a graphical user interface screen of the present invention displaying the 3D design of FIG. 17 after having been selected by a signed-in user to be printed upon payment of the fee, and after identifying which printer of the user is to be used, which 3D design will be protected against unauthorized redistribution in accordance with the present invention.
Figure 19:
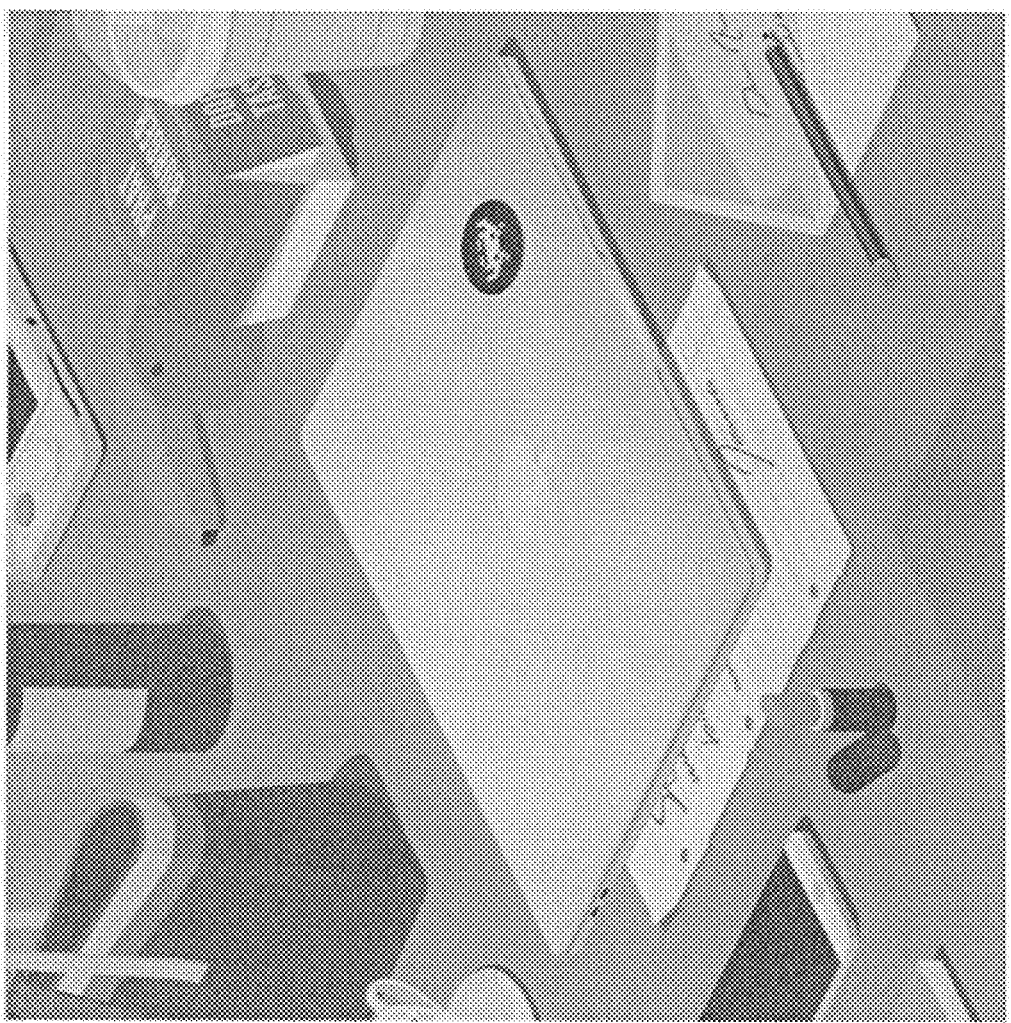
FIG. 19 illustrates a second sign-in GUI screen that may be used for a 3D print designer to sign in to upload his/her designs that are to be offered for sale to registered users.
Figure 20:
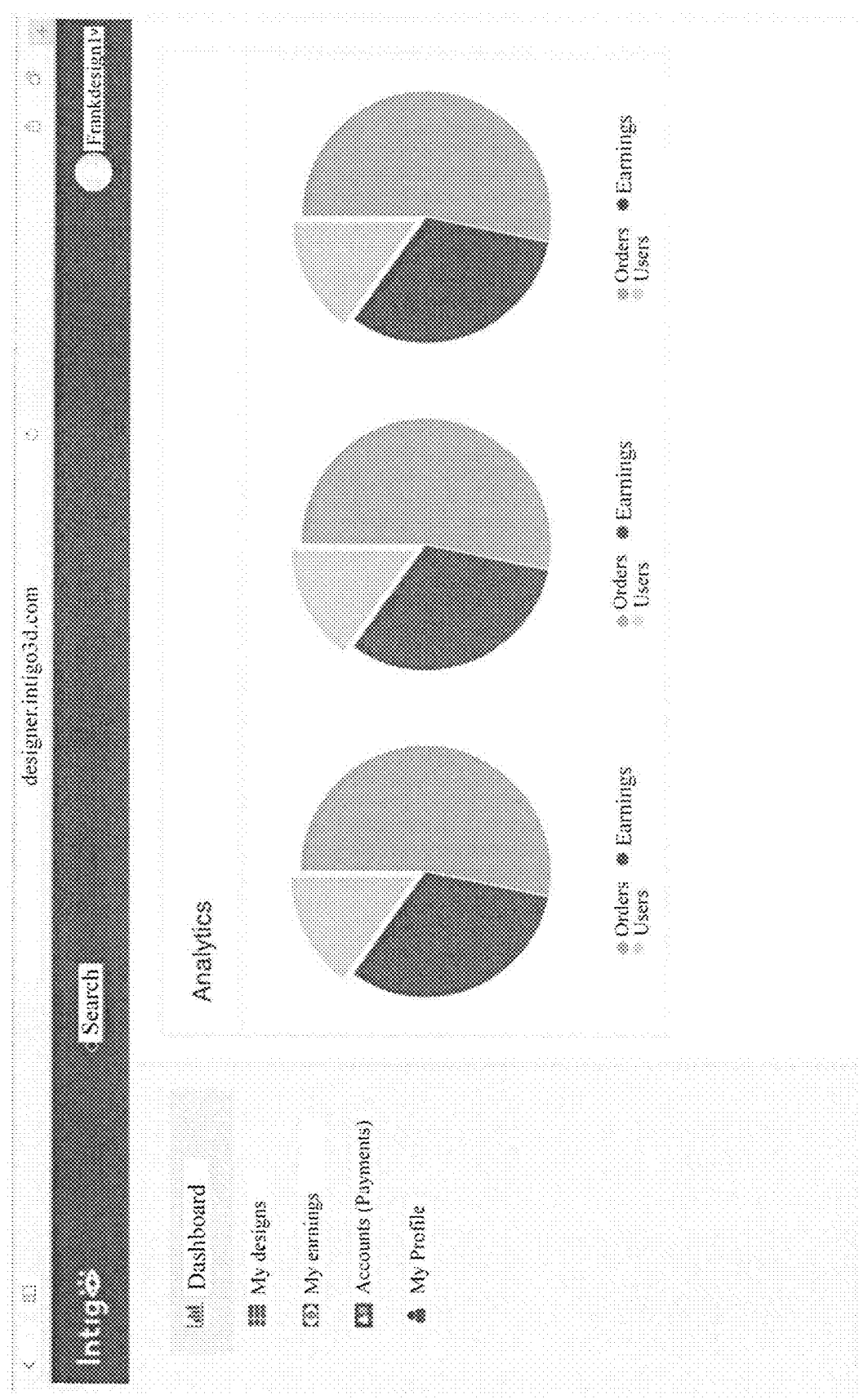
FIG. 20 is a GUI screen that may be used by 3D Print designers to monitor sales of their uploaded designs.

In one embodiment of the invention, as shown in FIG. 6A, a computer system may be configured for a method of controlling use of downloadable proprietary source code defining 3-1) object data usable for printing the object on a 3D printer. The computer system may include a first (internal) server, a second (central) server, and a single board computer. The first server, the second server, and the single board computer (SBC) may each include: a central processing unit and a non-transitory computer-readable storage medium (CRSM) comprising instructions to program the first server, second server, and single board computer, respectively. The instructions on the CRSM of the SBC may be configured to request a unique hardware ID from the first server, and the instructions on the CRSM of the first server may be configured to assign and send a unique hardware ID to the SBC. The CRSM of the first server may also be configured to send the newly assigned unique hardware ID to the second server. The instructions on the CRSM of the SBC may be configured to submit the unique hardware ID and a secret key to the second server to request registration of a user and a printer with the second server, and the instructions on the CRSM of the second server may be configured to send private certs, a client ID, and a unique public identifier to the SBC in response. The instructions on the CRSM of the second server configure the second server to receive and store the code defining 3D print designs from registered designers through a web designer portal, and to on-demand display the 3D print designs in a GUI screen (e.g., FIG. 17). The instructions on the CRSM of the SBC may be configured for a registered user to purchase a quantity of 3D print designs in the GUI, and the instructions on the CRSM of the second server may be configured to send an access token to the SBC in response to the purchase. The instructions on the CRSM of the SBC may be configured for redeeming the access token for a selected 3D print displayed in the GUI, and the instructions on the CRSM of the second server may be configured to adjust gcode of the selected 3D design for the particular printer(s) that was identified by the user during the registration or at a later time, and to stream the adjusted gcode to that printer. Note that more than one 3D printer type may be registered and used, and the system will provide adjusted gcode for the selected for the print. In one embodiment the CRSM of the second server may be configured to stream the adjusted gcode to the printer through the SBC, as shown in FIG. 6A, with Https streaming over a web connection to the SBC device either and internet connection provided to the SDC device, or Wi-Fi, or physical cable. The MQTT protocol may be used for messaging and notifications not data transfer. In another embodiment the CRSM of the second server may be configured to stream the adjusted gcode directly to the printer.

Figure 21:
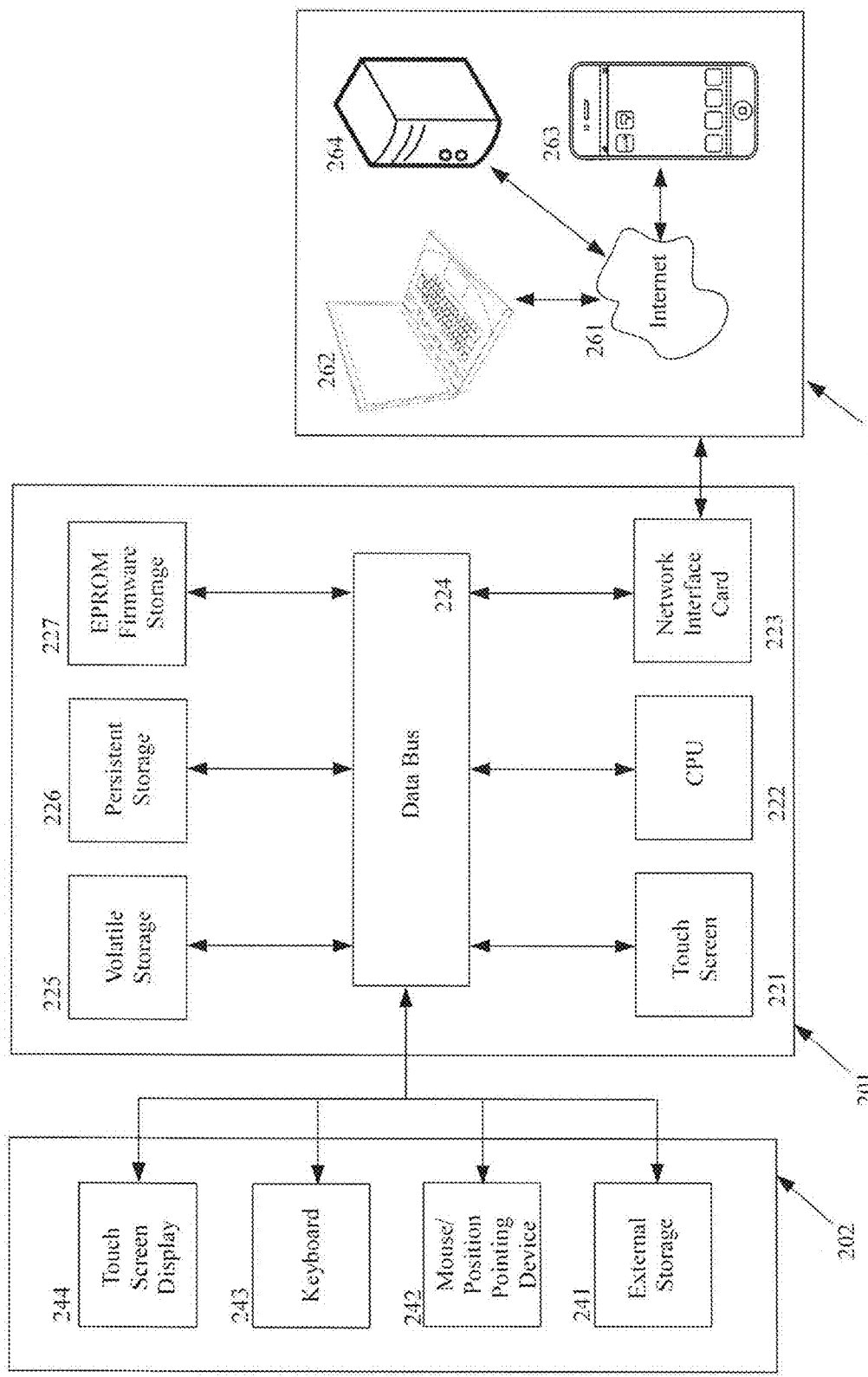
FIG. 21 is a schematic illustration showing an exemplary computing unit capable of being programmed by the software instructions in accordance with at least one embodiment of the present invention, and which may include personal computers, cellular phones, and other mobile devices.

The computer system disclosed herein, and corresponding software, may include components of any standard computing device, such as a server, a tablet, a cell phone, or other mobile smart device, so a description of such an accessorized exemplary computer system is hereinafter disclosed, even though a particular embodiment may not require all of the described components. Exemplary computer system 200 (i.e., a client device associated with a particular user) is shown schematically in FIG. 21, and which may comprise computing unit 201 interacting with external peripherals 202, such as a separate touch screen display 244, and interacting with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static non-transitory storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of non-transitory computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A computer system configured for digital rights management (DRM) to control distribution and track downloadable proprietary source code defining a 3-D object usable to print the 3-D object, and to protect the 3D object data from unauthorized printing, said one computer system comprising:
   a 3D printer; said 3D printer configured to deposit successive layers of a material, to form the 3D object;
   one computer, said one computer comprising a memory; said one computer configured to store and permit download from an inventory of proprietary source code corresponding to designs of a plurality of 3D objects from a plurality of different designers, said one computer being a single board computer having a unique hardware ID configured to provide an online store environment to permit the plurality of designers to market the respective designs only from said one computer;
   wherein said one computer is configured to interact with an operating system that controls said 3D printer;
   wherein said one computer is configured to display the inventory of designs of the plurality of 3D objects in the online store;
   wherein said one computer is configured to permit a user to browse the designs in the online store, and said one computer is further configured to send a digital file containing the proprietary source code for each of the designs of the plurality of designers to said 3D printer when purchased;
   wherein said one computer is configured to permit the user to securely purchase use of the source code of a desired 3D object in the online store;
   wherein said one computer is configured to send a digital file containing the proprietary source code defining the desired 3D object to said 3D printer after it is paid by the user;
   wherein said one computer is configured to control each print of the desired 3D object made by the 3D printer to prevent further use of the source code when the purchased use is completed;
   wherein said one computer is configured to control the number of prints of the desired 3D object by controlling the proprietary source code defining the desired 3D object;
   wherein said one computer is configured to limit access to the source code to prevent unauthorized use; and
   wherein said one computer is configured to store the DRM associated with the purchased code in a database.

2. The computer system according claim 1, wherein the control of the number of prints to prevent unauthorized use of the source code after the purchased use is completed comprises said one computer being configured to delete the source code after the purchased use in completed.

3. The computer system according claim 1, wherein the control of the number of prints to prevent unauthorized use of the source code after the purchased use is completed comprises said one computer being configured to transmit the source code to delete after a set time period has elapsed.

4. The computer system according claim 1, wherein the control of the number of prints to prevent unauthorized use of the source code after the purchased use is completed comprises said one computer configuring the source code transmitted by said one computer to delete after the object is printed by said 3D printer.

5. The computer system according claim 1, wherein the control of the number of prints to prevent unauthorized use of the source code after the purchased use is completed comprises said one computer configuring the source code transmitted by said one computer for portions of the source code to delete as those portions of the object are printed by said 3D printer.

6. The computer system according claim 1, wherein said database comprises a print card.

7. The computer system according claim 1, wherein said database is in the cloud.

8. The computer system according claim 1, wherein said database is in said memory of said one computer.

9. The computer system according claim 1, wherein said one computer comprises: means for receiving a 3D print file configured to manipulate the operating system that controls said 3D printer.

* * * * *